United States Patent [19]
Niemöller et al.

[11] 4,312,443
[45] Jan. 26, 1982

[54] SCRAPER FOR CHAINS IN CHAIN CONVEYORS, PARTICULARLY FOR USE UNDERGROUND

[75] Inventors: Gerhard Niemöller, Waltrop; Wilfried Stromberg, Datteln; Friedhelm Schneider, Witten, all of Fed. Rep. of Germany

[73] Assignees: Becker-Prünte GmbH, Datteln; Stahlhammer Bommern Gebr. Schneider, Witten-Bommern, both of Fed. Rep. of Germany

[21] Appl. No.: 896,461

[22] Filed: Apr. 14, 1978

[30] Foreign Application Priority Data

Apr. 20, 1977 [DE] Fed. Rep. of Germany ....... 2717448
Apr. 20, 1977 [DE] Fed. Rep. of Germany ....... 2717449

[51] Int. Cl.³ ............................................. B65G 19/24
[52] U.S. Cl. ..................................... 198/731; 198/733
[58] Field of Search ............... 198/725, 727, 728, 729, 198/731, 733, 734

[56] References Cited

U.S. PATENT DOCUMENTS 3,722,664 3/1973 Hart et al. .................. 198/731 X
3,869,039 3/1975 Temme et al. ................. 198/734
4,105,110 8/1978 Braun et al. ................. 198/728 X

FOREIGN PATENT DOCUMENTS

2359605 11/1974 Fed. Rep. of Germany ...... 198/731

Primary Examiner—Robert B. Reeves
Assistant Examiner—Douglas D. Watts
Attorney, Agent, or Firm—Andrus, Sceales, Starke & Sawall

[57] ABSTRACT

A two part scraper for a chain conveyor has upper and lower parts joined along a horizontal dividing surface. The surface contains bar and groove interlocking means and at least a pair of chain beds for securing the scraper to a link of the chain.

6 Claims, 13 Drawing Figures

SCRAPER FOR CHAINS IN CHAIN CONVEYORS, PARTICULARLY FOR USE UNDERGROUND

BACKGROUND OF THE INVENTION

The invention relates to a scraper for chains in chain conveyors, particularly for use underground, with a lower part which can be bolted to an upper part, the two parts each bearing one part of one or more chain beds through which a level dividing plane passes, as well as each bearing one part of the recesses provided for the bolts located outside the chain bed, where the upper and the lower parts at least partly interlock.

This type of two-part scraper has the important advantage that the straps required for attaching the chains to other scraper construction forms are not required here, and that the upper and lower parts are easier to handle than one-piece scrapers. This is particularly significant for underground operation, since the chain conveyor frequently has to be assembled at the face or in the immediate vicinity of the site where it is to be used, under correspondingly difficult conditions. On the other hand, the straps mentioned above have the advantage compared with the chain bolts which are used equally frequently that longer lengths of chain can be used between the scrapers, being known for this reason as long-length chains.

The scrapers of the design described in this introduction are divided along several planes which lie generally perpendicular to each other; the bolts are arranged horizontally and perpendicular sections of the dividing planes pass through the recesses for these in the scrapers. Due to this path of the dividing plane, the upper part and the lower part also interlock, which ensures that there can be no separation of the two parts under the effect of the bending forces acting on the scrapers.

However, the known scraper construction does not take into account the considerable amount of wear to which such scrapers are subjected due to the fact that they rest on the floor and the lateral guides of the conveyor trough. In fact, due to the described path of the dividing plane, the two end sections of the scraper are formed one on the upper part and one on the lower part of the scraper, and therefore with corresponding wear the whole scraper has to be changed. The known type of division also produces additional wear due to the fact that the main stressing of the scraper is caused by forces which act on its ends, so that, bearing in mind the tolerances which arise through the forging of the scraper halves, premature wear of the bearing surfaces on the upper and lower parts where these touch the dividing plane also arises.

Attempts have certainly already been made to counteract the wearing of the scrapers. With one-piece scrapers the said chain straps have had plastic strips or shoes fitted on their end faces in order thus to avoid frequent replacement of the scrapers. However, these measures cannot be applied directly to two-part scrapers, which are more advantageous for the reasons given in this introduction, and they would also not prevent the wear due to the tolerances in two-part scrapers.

SUMMARY OF THE PRESENT INVENTION

According to the invention the wear caused by rubbing on the scraper is taken up on a replaceable scraper part, and the wear caused by the tolerances is virtually eliminated.

This is achieved by the invention mainly due to the fact that the dividing plane runs continuously through and emerges at the ends of the scraper or at the upper face of the scraper, and that grooved and bar sections are used for the interlocking, formed on the surfaces which lie on opposite sides of the dividing plane, on the upper and lower parts.

Due to the described path of the dividing plane, a lower part is created which is continuous over the length of the scraper and extends across the whole width of the conveyor, and which therefore has all the surfaces which are subjected to a high degree of wear. Accordingly, when wear has occurred only the lower part needs to be replaced; the upper part can be used many times. The described path of the dividing plane has the further advantage that the forces which cause the main stressing of the scraper act mainly on the lower part and therefore do not really load the surfaces on the upper and lower parts which define the dividing plane. If bending of the scraper occurs under the effect of those forces, then this bending is carried out by the upper part as well, due to the frame-type of construction of the upper and lower parts. Here, the groove and bar arrangement on the surfaces of the upper and lower parts makes it possible to increase the bearing surfaces considerably, so that the stresses are reduced and therefore there is virtually no wear due to tolerances.

One embodiment of the invention is particularly advantageous for chain belts with two outer chains, being characterised in that on each end of the scraper there is a two-part chain bed for a flat link from a long-length chain arranged on the outside. This makes it possible in fact to avoid having to use short-length chains in this kind of chain belt as well, since the chain bolts mentioned in the introduction are not required. There have already been many attempts at solving this problem, but long-length chains lying outside could not be connected satisfactorily to the scrapers. However, this is achieved with the invention, since chain beds are provided on the ends of the scrapers, corresponding to the known and proved chain beds already used for long-length chains arranged in the centre or on either side of the centre.

Preferably, and according to another characteristic of the invention, the groove which terminates at the chain bed is formed on the lower part and the bar which extends the length of the groove is formed on the upper part. This has the advantage that the groove, which has a weakening effect, is formed in the lower part where it cannot have a damaging effect, since this is generally of more substantial construction, i.e. it forms more than half the scraper.

The invention also relates to a scraper for chain belts in scraper conveyors, particularly for mining and tunnelling operations, with an upper part which can be bolted to a lower part, and where the upper part and the lower parts interlock, with beds arranged in the centre, each being for one flat link of a double central chain, the beds being arranged adjacent to each other and having channels separated by a bar, the beds being separated from each other by a central crosspiece.

The chain belts of scraper conveyors are being driven increasingly by central chains instead of by chains lying on the outside. We differentiate here between double central chains which operate with two chains arranged parallel to each other on either side of the centre of the conveyor, and central chains which run in the centre of the conveyor. Conveying with central chains has the advantage that the chain belt runs more easily in horizontal and spatial curves. On the other hand, although the double central chain is more difficult to bend round curves like this, it has the advantage of being relatively stronger and more reliable.

Two-part scrapers have advantages compared with one-piece scrapers, since the straps which are used with one-piece scrapers for attaching the scrapers to the horizontal links are not required here for clamping the links. This makes it possible to avoid weakening the scraper in the middle, thus at the point which is particularly highly loaded with the forces acting on the scraper, which cannot be avoided when using such straps. Moreover, two-part scrapers can be used for central chains or for double central chains.

Dividing the beds for the link to be clamped in a two-part scraper as described in the introduction has the advantage that so-called long-length chains can be used in the chain belt. These long-length chains make the chain bolts necessary for short-length chains superfluous; these not only involve increased outlay, but are also frequently the reason for broken chains.

With two-part scrapers which have the features described in the introduction and are intended for double central chains, the aim has been in the past to construct the chain bed intended to hold a link lying flat in such a way that the most extensive possible support of the link is ensured. In particular, provision is made for the chain steel to be encompassed right round by the said channels. In addition, the channels are made of such a length that they are shaped at the ends corresponding to the shoulders of the rounded parts of the clamped link which is lying flat, and in the ends of the channels there are also rounded out recesses to support the perpendicular link which is connected to the clamped link.

On one hand, this construction of the chain bed does not take into account the relatively wide tolerances which arise both in the chain steels or chain links and which are also present in the parts of the chain bed in the scraper, which is generally forged, which are caused by this manufacturing method. The extensive support of the chain link on the confines of the chain bed as intended in the design is not achieved at all. On the other hand, the designed extensive adaptation of the chain bed to the clamped link has the disadvantage that other scrapers are needed in order to operate the chain conveyor with central chains, since the scrapers for double central chains are only suitable for this type of installation.

This state of affairs is particularly inconvenient underground, since frequently during the installation of a conveyor of this kind the installation conditions change, so that, for example, the ability to traverse curves is required, and correspondingly the transition from double central chains to central chains is necessary, or vice versa for short gradients on the conveying path. In such cases all the scrapers or the whole chain belt has to be replaced.

A two-part scraper according to the invention is suitable for installation on a chain belt with either double central chains or a central chain, and retains the basic advantages described in the introduction.

This is achieved by the invention due to the fact that the central crosspiece is designed to hold a central chain link which is lying flat, and in that the central crosspiece as well as the bars separating the channels of the beds for the double central chain have supporting sections on their end faces to support the curved parts of the perpendicular links connected to the embedded links.

With the invention, the flat, clamped links are actually intended always to rest with only part of their periphery on the channel walls. This results from the fact that the distance between the shanks of a central chain is greater than the distance between the shanks of the links of a double chain, due to the comparatively larger diameter of the chain steel. For example, the central chains are made with a 30 mm diameter chain steel and double central chains are made with a 26 mm diameter chain steel.

With the invention, the dimensions can be selected in the designs so that the clamping of the thicker chain of a central chain is effected over the complete circumference of 360°, but only a fraction of the double central chain, thus around 90°, for example, is enclosed. On the other hand the actual clamping effect which is obtained with the known scrapers, bearing in mind the tolerances totalling ±1.8 to 2.0 mm, is also considerably less than shown on the designs, so that as a result the reduction in clamping effect in the peripheral direction which must obviously be taken into account when the invention is put into effect, is not as great compared with the prior art as would appear in theory.

For this reason, according to the invention the enclosure of the horizontal link which is to be clamped is reduced in the axial direction by shortening the channels. This is compensated by increasing the support on the supporting sections on the end faces for the perpendicular links connected on either side of the clamped horizontal link.

The combined effect of these measures means that the distinct advantage is obtained that the scraper is equally well-suited for both types of use, thus operation with double central chains and also with a central chain. Accordingly, scraper conveyors can be adapted to give greater ability for traversing curves, or greater security, as required, without the scrapers or even the whole chain belt having to be changed over. The ability to remain in place affords corresponding advantages.

More specifically, right from the design stage provision is expediently made to shorten the channels holding the double central chain links to the length of the straight link shank, and to equip the supporting sections with recesses to partially enclose the supported perpendicular links.

It is important on the other hand to divide the scrapers into an upper and a lower part in such a way that a sufficiently strong connection is ensured between the upper and lower parts in spite of the conversion of the different beds for the clamped links. This is achieved with a construction form of the invention in which the dividing plane between the upper and lower parts runs continuously level, with bent out terminal sections, and emerges on the upper face of the scraper, and in which the interlocking is effected by grooved sections running in the lengthwise direction of the scraper adjacent to the chain beds in the lower part, and bar sections on the upper part; furthermore, in this construction form of the invention the transverse section of the lower part is enlarged next to the chain beds, which are provided on a bar-shaped central section of the lower part.

A scraper of this kind therefore has a new type of lower part which extends over the whole width of the conveyor trough right into the side guideways of the trough. The lower part thus generally has the greater portion of material and is therefore not detrimentally affected by the weak points which are associated with the grooved sections. In addition, wear is concentrated almost entirely on the lower part so that the upper part can be used more than once.

An upper part of this kind can also be designed according to another construction form of the invention in such a way that it improves the enclosure of the chain. According to the invention the upper part is provided for this purpose with several supporting projections on each longitudinal side for the steel central chain links which are connected to the horizontal link located on the chain bed.

Another measure which improves the enclosure of the clamped link consists according to the invention in providing rounded recesses in the side of the upper part facing the lower part, for the steel links connected to the horizontal links of the double central chains lying in the chain beds.

BRIEF DESCRIPTION OF THE DRAWINGS

The details, further features and other advantages of the invention can be found in the following description of construction forms with reference to the Figures in the Drawings.

DETAILED DESCRIPTION OF THE PREFERRED EMBODIMENT

Figure 1:
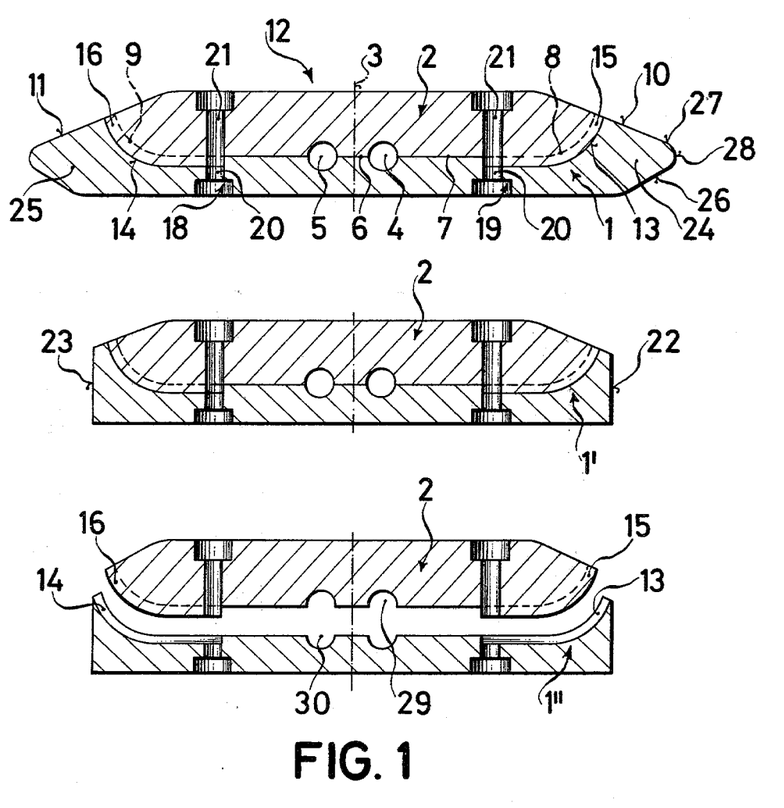
FIG. 1 shows several construction forms for single chain conveyors with a central chain.
Figure 2:
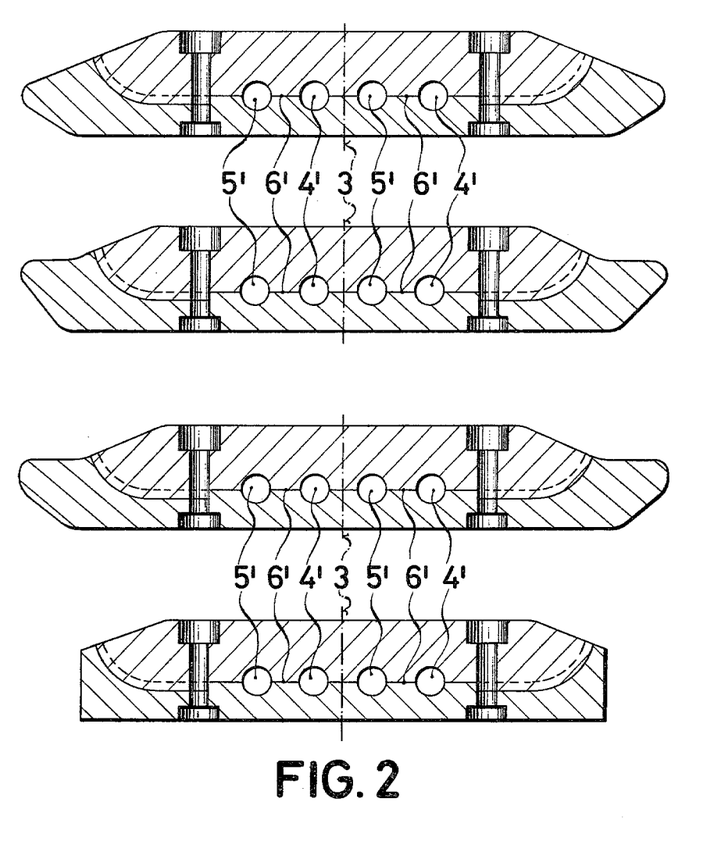
FIG. 2 shows several construction forms of scrapers for double central chain conveyors.
Figure 3:
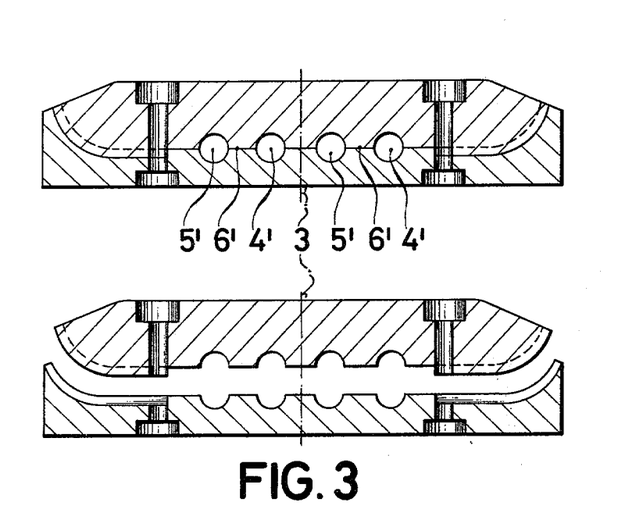
FIG. 3 shows further construction forms of scrapers for double central chain conveyors.

The basic construction of the new scraper can be seen in FIGS. 1-3. The scrapers illustrated in these Figures differ from one another basically only in their shaping.

The scrapers illustrated in FIG. 1 have a lower part 1 and an upper part 2. In the centre, which is indicated by the dashed line 3, runs a long-length chain. The scraper has a chain bed for holding a link (not shown) which is lying flat, consisting basically of two parallel chain ducts 4 and 5 and a central bar 6. The chain bed is divided into two equal halves by the horizontal central section 7 of the dividing plane, whoch ensures particularly all-round enclosure of the chain steel, naturally bearing in mind the normal tolerances. The dividing plane has two other sections 8 and 9 which are partly bent and shaped in such a way that the dividing plane emerges on sloping surfaces 10 and 11 respectively in the vicinity of the ends of the scraper on the upper face of the scraper, which is given the general designation 12.

Whilst the surfaces which touch each other in section 7 of the dividing plane are flat so that in the central area there is no interlocking of the upper and lower parts, in each of sections 8 and 9 of the dividing plane there is a groove 13 or 14 respectively in the lower part 1, and bars 15 and 16 which fit the respective grooves are arranged on the upper part 2.

The dividing plane is also designed so that the recesses 18 or 19 required for the two connecting bolts which are not shown in FIG. 1 are divided into two unequal halves 20 and 21 respectively. The bolts therefore run perpendicularly from top to bottom and are laid out moreover in such a way that they lie ouside the chain bed 4-6 described above and thus in the ends of the scraper, which are subjected to less stress.

In the construction form illustrated in the centre of FIG. 1, only the ends of the scraper are different. They have vertical end faces 22 and 23, whilst the scraper ends given the general designation 24 and 25 on the scraper shown in the upper illustration in FIG. 1 have two convergeant sloping surfaces 26 and 27 respectively, with a curved connecting surface 28.

In the lower part of FIG. 1 the construction form shown in the centre is drawn with the upper part 2 and the lower part 1 of the scraper separated. This shows the two halves 29 and 30 of the chain bed made up of parts 4-6.

The construction form illustrated in FIG. 2 differs from the construction forms shown in FIG. 1 mainly in that on either side of the central plane 3 there is a chain bed with the main parts 4'-5'. These parts also occur in the construction form shown in FIG. 3, which is shown corresponding to the illustration drawn in the lower part of FIG. 1 and described above.

Figure 4:
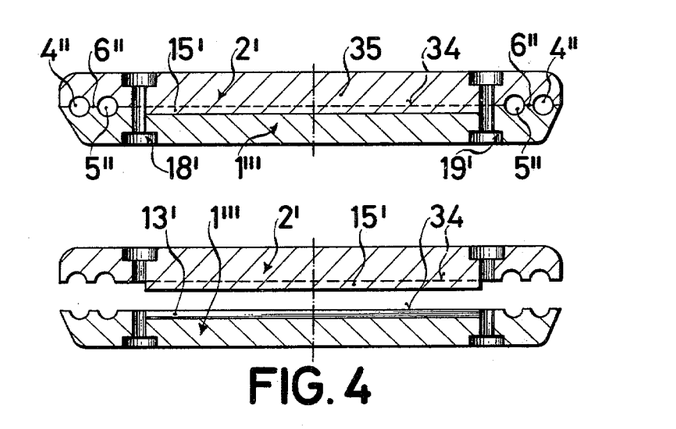
FIG. 4 shows a scraper for an outside chain conveyor, where the upper and lower parts are shown together at the top and separated at the bottom.

FIG. 4 shows a construction form for long-length chains arranged on the outside. The dividing plane here runs continuously horizontal and is therefore designated 34. The central part 35 which lies between the two recesses 18 and 19 for the connecting bolts has the groove and bar arrangement described above. The bolts lie inside and beyond the two chain beds with the sections 4''-6''. The lower illustration shows that in this construction form as well the bar 15' is formed on the upper part 2 and the groove 13' in the lower part.

Figure 5:
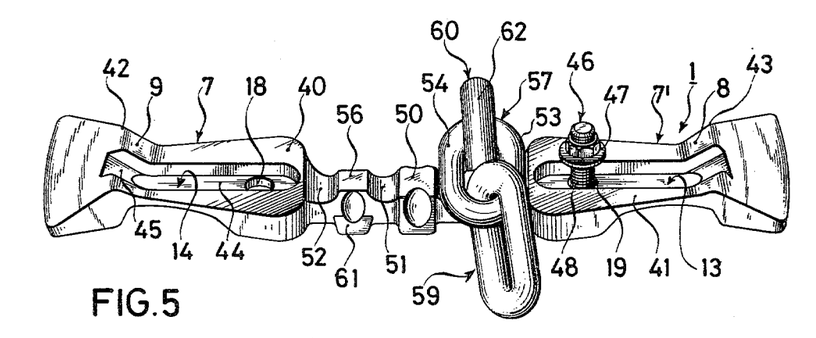
FIG. 5 shows a perspective and generally plan view onto the lower part of a scraper for double central chain conveyors.

FIG. 5 shows details of a scraper according to the invention for double central chains. The lower part shown here is shown in the Drawing lying on the floor of the trough. The dividing plane has generally horizontal sections 7 and 7', so that in this area of the lower part flat surfaces 40 and 41 are formed. Thedividing plane also has sections 8 and 9 running upwards, and emerges on the upper face of the scraper at 42 and 43. In each of the surfaces 40 and 41 there is a groove 13, 14 which has a horizontal base 44 and an obliquely rising adjoining section 45 corresponding to the path of surfaces 40, 41 and 8 or 9 respectively. In the base 44 there is the recess 18 or 19 respectively, appertaining to the lower part 1, for the connecting bolts. Each of these bolts is provided with a nut 46, which has a flange 47 to rest on a corresponding counter surface in the upper half of the recess, and its shank 48 has an appropriate screwhead. The two chain beds are separated from each other by a crosspiece 50 arranged in the centre. The chain beds are of identical construction, so that it will be sufficient to describe just the left-hand chain bed, in which no chain is shown.

This chain bed has two chain channels 51 and 52, which encompass half the chain steel of the link shanks 53, 54 of a link which lies flat. The two chain channels 51 and 52 are separated from each other by a bar 56 which engages in the space inside the flat link 57. For the two perpendicular links 59 and 60 connected to the horizontal link 57, on either end face of the bar 56 there is a supporting section 61 on which the relevant section of the rounded part of the links rests, one of these being shown at 62.

Figure 6:
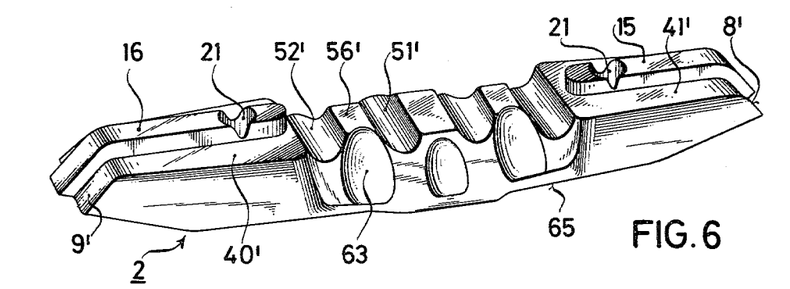
FIG. 6 shows the associated upper part, in an inverted position, corresponding to the illustration in FIG. 5.

Appertaining to the lower part 1 shown in FIG. 5, there is the upper part 2, which is shown resting on its upper face 65 in FIG. 6. The upper part therefore has on the left the dividing plane surfaces which correspond to the lefthand surfaces of the lower part and which are each therefore designated with an apostrophy. Thus, surfaces 40' and 41' correspond with the surfaces 40 and 41 in the lower part. These surfaces lie on either side of a bar 14 or 15 which fits in the groove 13 or 14 respectively. The upper halves 21 of the recesses for the bolts are located in the bars. Since the chain beds are divided there are corresponding parts in the upper part as well, which are therefore designated with an apostrophy. However, it should be noted that the ducts 51' and 52' are longer in the upper part than the ducts 51 and 52 corresponding to them, and that instead of the supporting sections 61 there are recesses 63 which are hollowed out corresponding to the rounded parts 62 of the perpendicular links.

Figure 7:
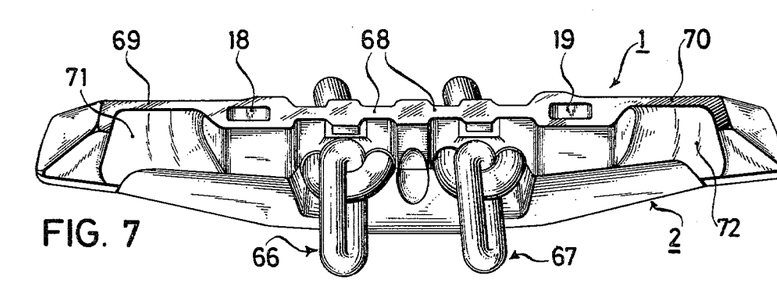
FIG. 7 shows the two parts shown in FIGS. 5 and 6 in the assembled state; the bolts have been omitted. The assembled scraper is shown in the inverted position, i.e. the lower part of the scraper, shown in FIG. 5, has been inverted and placed on the associated upper part, oriented as in FIG. 6.

When the upper part and the lower part are connected together, these parts assume the position relative to the two central chains 66 and 67 and to each other which is shown in FIG. 7. It will be appreciated that in FIG. 7 the scraper has been shown reversed to facilitate understanding, i.e. the lower part lies at the top. It can be seen that the lower part has a narrower bar-shaped contact surface which continues in the form of a bar in the vicinity of the chain beds where it is designated 68. Next to the recesses 18, 19 the bar is formed by the flattened rear 69 and 70 of rounded off sections 71, 72. This bar 68-70 serves as the wear edge and cleaning strip which improves the conveying effect.

Figure 8:
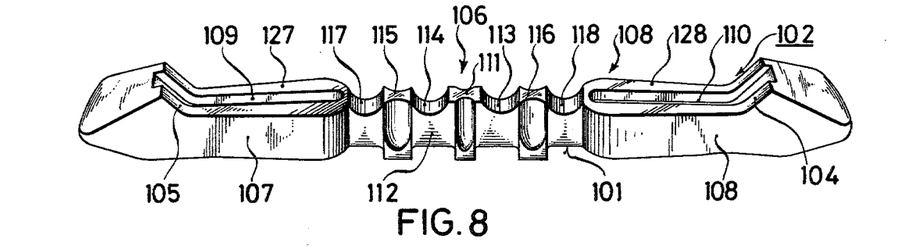
FIG. 8 shows a perspective view of a lower part of a scraper according to the invention.

The lower part of the scraper shown in FIG. 8 and designated 102 has a lower face 101 which is adapted to the conditions in the conveyor trough, (not shown), and is therefore substantially pre-determined. The upper face runs along a dividing plane which has a central section extending over the middle of the scraper and generally designated, and two adjoining sections 104 and 105 which curve upwards. Along the perpendicular central plane the scraper is constructed symmetrically, so that it will be sufficient to describe in detail the end face shown in FIG. 8.

Figure 9:
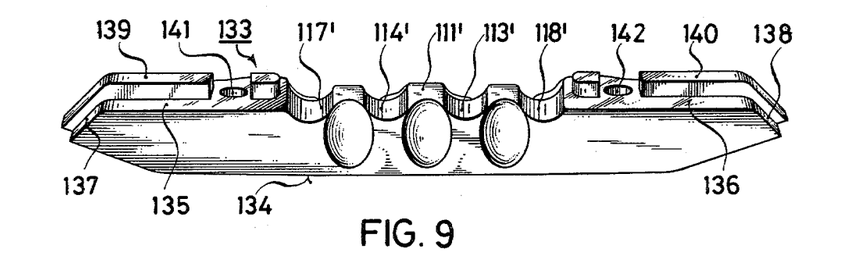
FIG. 9 shows the upper part, in the inverted position, belonging to the lower part shown in FIG. 8, correspondingly drawn.

The end sections 107 and 108 arranged on either side of a central part given the general designation 106 and which form a structural unit with the central part 106, bear on their upper surfaces which face the dividing plane the grooved sections 109 and 110 respectively which form the interlocking device together with the upper part shown in FIG. 9, and prevent separation of the upper and lower parts under the effect of the forces which arise.

The central part 106 bears the bed for the link which is to be clamped in to connect the scraper to the chain of the chain belt. For operation with a central chain a central bar 111 is used which projects into the space inside a horizontal link of the central chain. This bar 111 is constructed on a bar 112 which forms the central part 106 which has a channel 113 or 114 on its upper face on either side of the central bar 111. These channels have a continuously constant cross-section and are also identical to each other. They serve both to house the straight shanks of the horizontal central chain link which has been placed over the bar 111, and also to hold the links, also lying horizontally, of a double central chain. These links are in turn placed over bars 115 and 116, adjoining each of which on the outside there is a channel 117 or 118 respectively. On each end face of the bar 112 which forms the central part 106 there are supporting sections, of which, however, only the supporting sections arranged on one side of the bar 112 can be seen in FIG. 8. For this reason, reference will now be made to the schematic illustration shown in FIG. 13.

Figure 13:
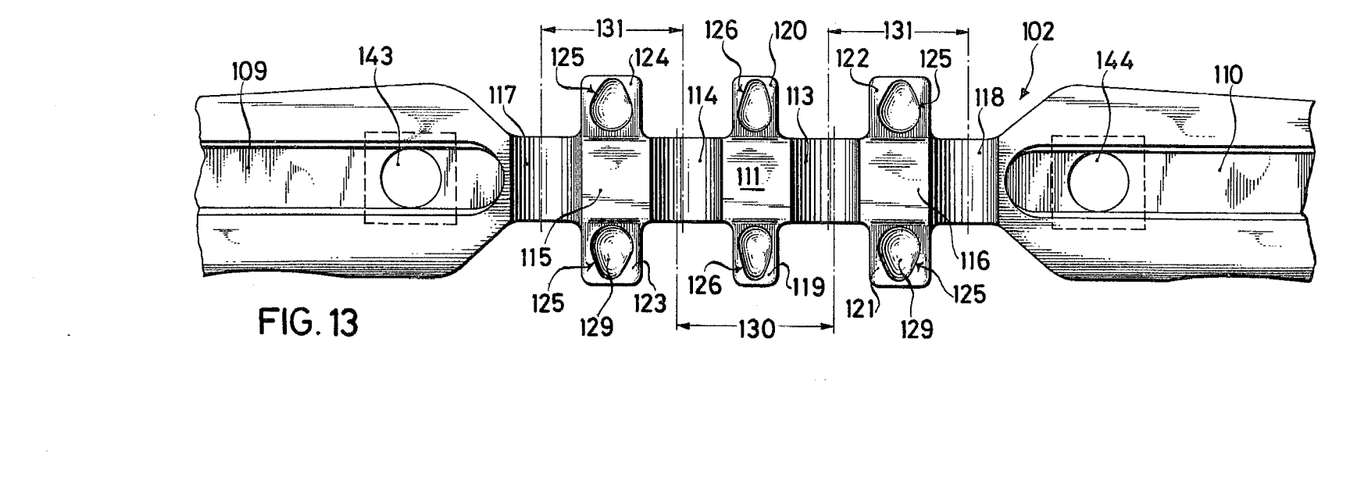
FIG. 13 is a plan view onto the lower part to show the chain distribution.

The supporting sections can be seen here. One supporting section is located on each of the two end faces of the central bar 111, and these supporting sections bear the reference numerals 119 and 120. Similarly, on the end faces of the bars 115 and 116 there are supporting sections 121, 122 or 123, 124. Each supporting section also has a recess 125 (supporting sections 121–124) or 126 (supporting sections 119, 120). Since the recesses in the supporting sections which are associated with the bars 115 or 116 are identical, they only need be differentiated from the recesses 126 in the supporting sections 119 and 120 which are associated with the central bar 111. There the recesses 126 are in fact narrower, because the supporting sections 119 and 120 are narrower in the longitudinal direction of the scraper than the supporting sections 121–124. For the rest, each of the recesses is hollowed out as is indicated in the supporting section 121 with the reference numeral 129.

As can be seen also in FIG. 13, the two channels 113 and 114 arranged on either side of the central bar 111 are wider than the channels 117 and 118 which lie on the outside. This is due to the relatively wide chain separation which is shown at 130 for the central chain (chain steel diameter 30 mm) and at 131 for the double central chain (chain steel diameter 26 mm).

The scraper upper part shown in FIG. 9 and given the general designation 133 belongs to the scraper lower part shown in FIGS. 8 and 13. The upper part is shorter than the lower part 102 due to the path of the dividing plane described above. In addition, the scraper upper part 133 is shown in FIG. 9 lying on its upper face so that the shaping facing the dividing plane can be seen more clearly.

The surfaces 135 and 136 corresponding to the surfaces 127 and 128 in the lower part 102, and the surfaces 137 or 138 in the upper part 133 corresponding to the surfaces 104 and 105 in the lower part 102 are equipped with bar sections 139 and 140. These bar sections fit in the groove sections 109 and 110 in the lower part 102 and ensure the interlocking of the lower part 102 with the upper part 133. The upper part has recesses 141 or 142 which pass from top to bottom, which are completed by recesses 143, 144 (FIG. 13) and are used for inserting bolts with which the upper and lower parts can be bolted together. These bolts are not shown. However, they are located outside the central zone 106 in which the lower part is narrowed, so that the recesses cannot further weaken the scraper at a susceptible point.

The upper part also has the parts which correspond to the chain beds described above. These are each designated with an apostrophy to simplify the illustration. Corresponding to the construction of the lower part, the upper part has several hollowed out recesses 145, 146 (FIG. 10) on each longitudinal side, shaped to fit the rounded parts of the links and the chain steel, for use with double central chains. These recesses act on the perpendicular links 157–159 which adjoin either side of the clamped horizontal links 155 and 156.

According to the construction examples shown, not only can uniform lower parts be used for both types of operation, but also uniform upper parts. This means that when the type of drive is changed only the chains need be changed.

Figure 10:
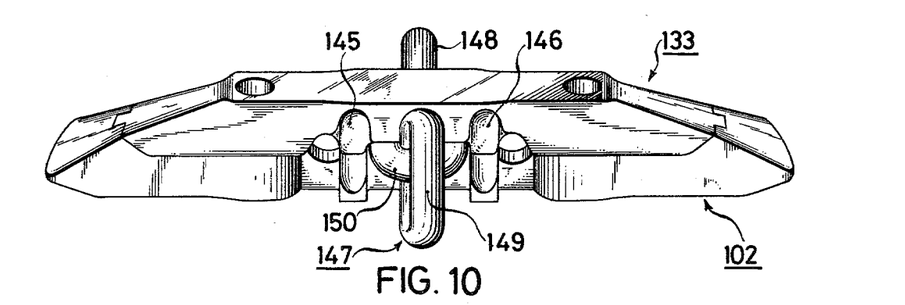
FIG. 10 is an illustration corresponding to FIGS. 8 and 9, showing the scraper attached to a central chain, with the bolts omitted.

When using double central chains (FIG. 11) the hollowed-out recess 152 in the upper part, which is naturally provided on both sides, is not used. It is used to support the links 148, 149 of a central chain with operation as shown in FIG. 10. On the other hand, the recesses 152 are not used with the type of operation with individual chains 153 or 154 forming a double central chain (FIG. 11).

Figure 11:
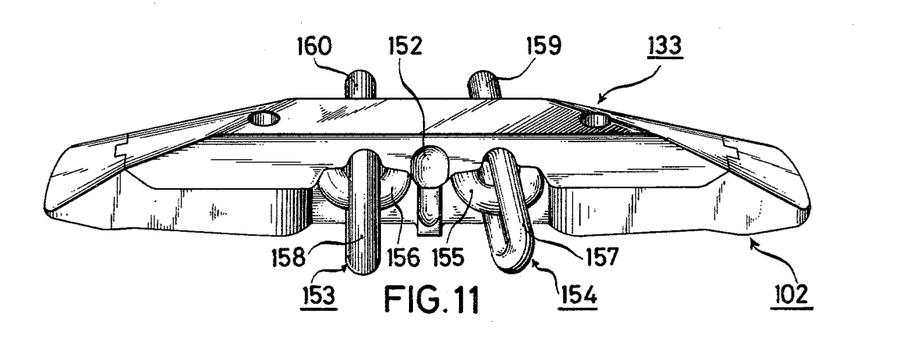
FIG. 11 is an illustration corresponding to FIG. 10, showing the fitting of the scraper to a double central chain.

In FIG. 11 only the recesses appertaining to the links 157 and 158 can be seen, due to the chosen method of illustrating.

Figure 12:
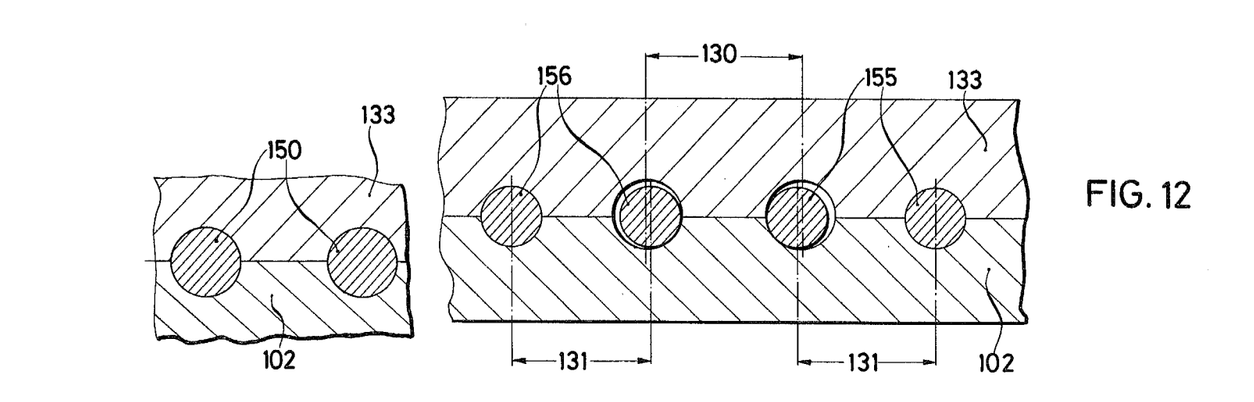
FIG. 12 shows the relationship between the radial enclosure of the chain links for central chains and double central chains.

FIG. 12 shows schematically the enclosing of the links with the different types of operation, as determined by the design. It will be seen that the enclosure of the horizontal links 155 and 156 of the double central chains 153 and 154 is designed to be 360° for the outer shank of links 155 and 156, whilst the enclosure of the inner shank amounts to 90°. The enclosure of the horizontal link 150 of the central chain amounts to 360° for each link-shank in the construction example shown.

I claim:

1. Scraper for chain belts on scraper conveyors, particularly for mining and tunnelling operations, which has an upper part which can be bolted onto a lower part, and where the upper and lower parts interlock and are subdivided by centrally arranged beds each for one flat link of a double central chain, where the beds are arranged next to each other and have channels separated by a bar, as well as being separated from each other by a central bar, characterised in that the central bar (111) is designed to take one flat link (150) of a central chain, and that the central bar (111) and the bars (115, 116) which separate the channels (113, 114; 117, 118) of the beds for the double central chain are equipped with supporting sections (121-124; 119, 120) on their end faces, to support rounded sections of perpendicular links (157-160; 148, 149) connected to the embedded links.

2. Scraper according to clam 1, characterised in that the channels (117, 118; 113, 114) for holding the double central chain links are shortened to the length of the straight shank of the link and the supporting sections (121-124, 119, 120) have recesses (125, 126) for partially enclosing the supported perpendicular links.

3. Scraper according to claim 1 or 2, characterised in that the dividing surface between the upper and lower parts (102, 133) has curved end sections (104, 105) which emerge on the upper face of the scraper, that the interlocking is realised by means of grooved sections (109, 110) which run in the longitudinal direction of the scraper adjacent to the chain beds on the central part (106) in the lower part (102), and bar sections (139, 140) in the upper part (133), and that the cross-section of the lower part is enlarged next to the central section (106) which bears the chain beds on a bar-shaped central section (112).

4. Scraper according to claim 1 or 2, characterised in that the upper part (133) has recesses (145, 146; 152) for supporting the rounded sections of the links (157-160; 148, 149) connected to the flat link (150) located in the chain bed.

5. Scraper according to claim 1 or 2, characterised in that in the upper part, recesses provided for supporting the links connected to the flat links (155, 156) lying in the chain beds, said recesses being hollowed out and are located in the side facing the lower part (102).

6. Scraper according to clam 1, characterised in that the channels (113, 114) adjacent to the central bar (111) are more widely spaced in the longitudinal direction of the scraper than the channels (117, 118) lying outside, and that the supporting sections (119, 120) on the central bar (111) are narrower than the supporting sections (121-124) on the bars (115, 116).

* * * * *